(12) United States Patent
Garcia Tebar

(10) Patent No.: US 11,745,991 B2
(45) Date of Patent: Sep. 5, 2023

(54) UNIVERSAL LIQUID SOLUTION GENERATION PLATFORM

(71) Applicant: AIGUA, INC., Wilmington, DE (US)

(72) Inventor: Ivan Garcia Tebar, Tulum (MX)

(73) Assignee: AIGUA, INC., Wilmington, DE (US)

(*) Notice: Subject to any disclaimer, the term of this patent is extended or adjusted under 35 U.S.C. 154(b) by 0 days.

(21) Appl. No.: 17/548,449

(22) Filed: Dec. 10, 2021

(65) Prior Publication Data

US 2022/0098020 A1 Mar. 31, 2022

Related U.S. Application Data

(63) Continuation-in-part of application No. 17/616,169, filed as application No. PCT/US2020/036388 on Jun. 5, 2020.
(Continued)

(51) Int. Cl.
*B67C 3/22* (2006.01)
*B67C 7/00* (2006.01)
(Continued)

(52) U.S. Cl.
CPC .............. *B67C 3/22* (2013.01); *B01F 23/232* (2022.01); *B01F 25/40* (2022.01);
(Continued)

(58) Field of Classification Search
CPC ... B67C 3/22; B67C 3/007; B67C 7/00; B01F 23/232; B01F 25/40; B01F 35/2215;
(Continued)

(56) References Cited

U.S. PATENT DOCUMENTS 5,361,942 A * 11/1994 Salkeld ............... B67D 3/0029
222/479
5,573,142 A * 11/1996 Morellato ............... B67D 1/08
62/395
(Continued)

FOREIGN PATENT DOCUMENTS

WO 2004036479 A2 4/2004
WO 2015053837 A2 4/2015
(Continued)

OTHER PUBLICATIONS

European Application No. 20819184.1, Extended European Search Report dated Nov. 23, 2023, 18 pages.
(Continued)

*Primary Examiner* — Donnell A Long
(74) *Attorney, Agent, or Firm* — Marton Ribera Schumann & Chang LLP; Chien-Ju Alice Chuang; Hector J. Ribera (57) ABSTRACT

A platform for onsite creation of consumable liquids is provided. The platform includes a liquid generating machine, a set of cubes, compatible bottles, and a user interface device. The liquid generating machine may include a water storage module, a cube module, a liquid making module and a bottle filling and cleaning module. The platform decentralizes the production of consumable liquids, such as drinking waters, enhances the consumer's experience, significantly increases consumers' choices, all while simplifying the consumption process (buying the water, carrying it, getting rid of/recycling the plastic bottle, etc.). The platform includes customizable liquid generating recipes associated with the cubes that may be provided through a network or local database and a security feature that allows the authorization of users to generate and access controlled liquids.

17 Claims, 5 Drawing Sheets

Related U.S. Application Data (60) Provisional application No. 62/857,886, filed on Jun. 6, 2019.

(51) Int. Cl.

| | | |
|---|---|---|
| *B67C 3/00* | (2006.01) | |
| *B01F 35/221* | (2022.01) | |
| *B01F 23/232* | (2022.01) | |
| *B01F 25/40* | (2022.01) | |
| *C02F 1/04* | (2023.01) | |
| *C02F 1/00* | (2023.01) | |
| *B01F 101/14* | (2022.01) | |
| *A23L 2/54* | (2006.01) | |

(52) U.S. Cl.
CPC .......... *B01F 35/2215* (2022.01); *B67C 3/007* (2013.01); *B67C 7/00* (2013.01); *C02F 1/001* (2013.01); *C02F 1/04* (2013.01); *A23L 2/54* (2013.01); *A23V 2002/00* (2013.01); *B01F 2101/14* (2022.01)

(58) Field of Classification Search
CPC .... B01F 2101/14; B01F 23/236; B01F 35/22; B01F 35/7137; C02F 1/001; C02F 1/04; C02F 1/283; C02F 1/32; C02F 5/10; C02F 2101/322; C02F 2209/02; C02F 2209/10; C02F 2209/40; C02F 2303/04; C02F 2305/04; C02F 2307/10; C02F 1/003; A23L 2/54; A23V 2002/00; B67D 1/0057; B67D 2001/075; B67D 2001/1263; B67D 2210/00007; B67D 2210/00026; B67D 2210/00034; B67D 2210/00146; B67D 1/0078; B67D 1/0869; B67D 1/0888; B67D 1/0894; B67D 1/0895

See application file for complete search history.

(56) References Cited

U.S. PATENT DOCUMENTS

| | | | |
|---|---|---|---|
| 6,143,258 A * | 11/2000 | Tamura | B67D 3/0009 210/416.3 |
| 6,871,675 B1 * | 3/2005 | Marszalec | C02F 9/20 141/82 |
| 2002/0173875 A1 | 11/2002 | Wallace et al. | |
| 2004/0195263 A1 * | 10/2004 | Lassota | A47J 31/50 222/23 |
| 2007/0233567 A1 | 10/2007 | Daly | |
| 2008/0163756 A1 | 7/2008 | Stettes | |
| 2012/0193375 A1 * | 8/2012 | Forte | B67D 3/0022 222/146.1 |
| 2016/0027132 A1 | 1/2016 | Craparo et al. | |
| 2016/0297666 A1 | 10/2016 | Guy et al. | |
| 2016/0368753 A1 | 12/2016 | Bethuy et al. | |
| 2017/0344950 A1 | 11/2017 | Dhagumudi et al. | |
| 2018/0072553 A1 | 3/2018 | Lyons et al. | |
| 2019/0112174 A1 | 4/2019 | Alix et al. | |
| 2020/0031654 A1 | 1/2020 | Wing et al. | |

FOREIGN PATENT DOCUMENTS

| | | |
|---|---|---|
| WO | 2015103542 A1 | 7/2015 |
| WO | 20170180660 A1 | 10/2017 |

OTHER PUBLICATIONS

International Application No. PCT/US2020/036388, International Search Report and Written Opinion dated Oct. 8, 2020, 6 pages.

* cited by examiner

UNIVERSAL LIQUID SOLUTION GENERATION PLATFORM

CROSS-REFERENCE TO RELATED APPLICATIONS

The present application is a continuation-in-part of U.S. patent application Ser. No. 17/616,169, filed on Dec. 2, 2021, which is a national phase entry under 35 U.S.C. § 371 of International Patent Application No. PCT/US20/36388 titled "Universal Liquid Solution Generation Platform," filed on Jun. 5, 2020, published in English, which claims priority to U.S. Provisional Patent Application No. 62/857,886 filed on Jun. 6, 2019, all of which are incorporated herein by reference in their entirety.

BACKGROUND

The present application is related to a universal liquid generation platform for onsite creation of drinking waters and other fluids.

There is widespread consumer concern about the impact on the environment, and society in general, of bottled water production and distribution. Logistical costs, packaging and original water source are all related to the established centralized production and distribution model. At the same time, even the consumer groups with access to tap water in their homes prefer to consume, due to concerns over safety and taste, bottled drinking water, especially if it is produced by reputable and popular brands. Globally, any household, business and office where water is consumed suffers of the same deficient approach to delivery and consumption of water and other fluids.

Thus, what is needed is an improved liquid generation platform that safely, cost-effectively, and cleanly re-locates the production of drinking water, other beverages, and other fluids to the point of use.

SUMMARY

To address the issues with existing approaches, a novel platform for onsite creation of drinking waters and other fluids is provided. The system is composed of several elements, including the liquid generation machine, the cube, the bottle and the user interface app. The disclosed system effectively decentralizes drinking water production, enhances the consumer's experience with brands, significantly increases consumers' choices while simplifying the consumption process (buying the water, carrying it, getting rid of/recycling the plastic bottle, etc.). The platform provides for the expansion of branded products into a home/business on-site generation process with the provision of customizable capsules. The capsule contents can be custom-made and licensed for existing water brands, established consumer brands, food franchises, sports franchises, celebrities, pharmaceutical companies, hospitals, etc.

The disclosed universal liquid generation platform represents the most advanced, most sustainable and most engaging method to sell water, other beverages, and other fluids to date. This platform also offers an opportunity for drinking water companies to achieve significant reductions in production and distribution costs, expand their markets and decrease drastically their environmental footprint while simultaneously benefiting from their respective brands' market value, improved consumer experience and growth of sales. Compared to the current bottle-based drinking water distribution process, the new platform can deliver the same quality product with an average of 70 times reduction in volume, 35 times reduction in weight and total elimination of bottling plastics.

A liquid solution generating platform for generation of custom consumable liquids may include: a liquid generating machine, the liquid generating machine comprising: a water storage module for receiving purified water generated from a tap water source; a cube module for receiving and identifying a cube associated with a custom consumable liquid recipe, the cube module configured to retrieve a set of contents from the cube for generating the custom consumable liquid; a liquid making module for making the custom consumable liquid, the liquid making module coupled to the cube module for receiving the set of contents and coupled to the purified water module for receiving a volume of purified water specified the recipe and for mixing the set of contents with the volume of purified water according to the recipe, wherein the mixing further comprises at least one of circulating to a static mixer, dissolving a gas, or adjusting a temperature; and a bottle filling and cleaning module, the bottle cleaning and filling module coupled to the liquid making module for receiving the custom consumable liquid and inserting it into a bottle and further coupled to the purified water module and a steam module for steam cleaning the bottle, the bottle filling and cleaning module further comprising a communications interface for communicating with the bottle and an electrical charging interface for charging a battery in the bottle.

In some examples, the platform also may include a cube containing the set of contents and a machine-readable identifier, the machine-readable identifier providing access to a custom consumable liquid recipe when the cube module identifies the cube based on the machine-readable identifier. In some examples, the cube is formed of a glass-based material configured to withstand at least one of extreme temperature, extreme pressure, and extreme humidity. In some examples, the cube comprises a top part and a bottom part, the top part and the bottom part each including a sealed orifice configured to be punctured by the cube module. In some examples, a surface of the cube comprises a QR code. In some examples, the cube is equipped to provide a globally unique identifier (GUID).

In some examples, the platform also may include a bottle for receiving and storing the custom consumable liquid, the bottle comprising a smart base having a communications interface, a battery, and a charging circuit configured to recharge the battery when inserted into the bottle filling and cleaning module. In some examples, the smart base further comprises a controller for communicating with the bottle filling and cleaning module. In some examples, the bottle further comprises a display for displaying information associated with the custom consumable liquid. In some examples, the bottle further comprises a smart cap having a security mechanism configured to unlock upon an indication of an authorized user. In some examples, the indication includes an authorization signal received from a smartphone. In some examples, the authorization signal is generated by an application on the smartphone configured to recognize the authorized user.

In some examples, the platform also includes a water purification module to generate the purified water from the tap water source. In some examples, the water purification module comprises a water distillation module and the purified water comprises distilled water. In some examples, the water purification module comprises a water filtration module and the purified water comprises filtered water. In some examples, the custom consumable liquid comprises a drink. In some examples, the custom consumable liquid comprises a pharmaceutical.

The figures depict various example embodiments of the present disclosure for purposes of illustration only. One of ordinary skill in the art will readily recognize from the following discussion that other example embodiments based on alternative structures and methods may be implemented without departing from the principles of this disclosure and which are encompassed within the scope of this disclosure.

DETAILED DESCRIPTION

The following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments.

Figure 1:
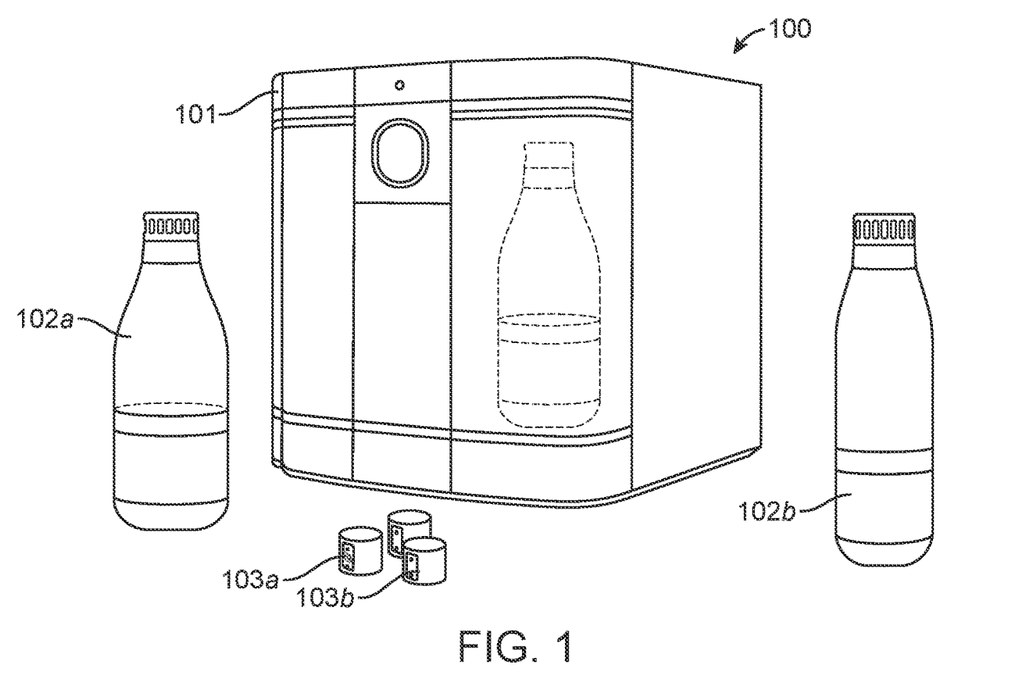
FIG. 1 is an illustrative diagram of components of a universal liquid generation platform according to embodiments.
Figures 2, 3:
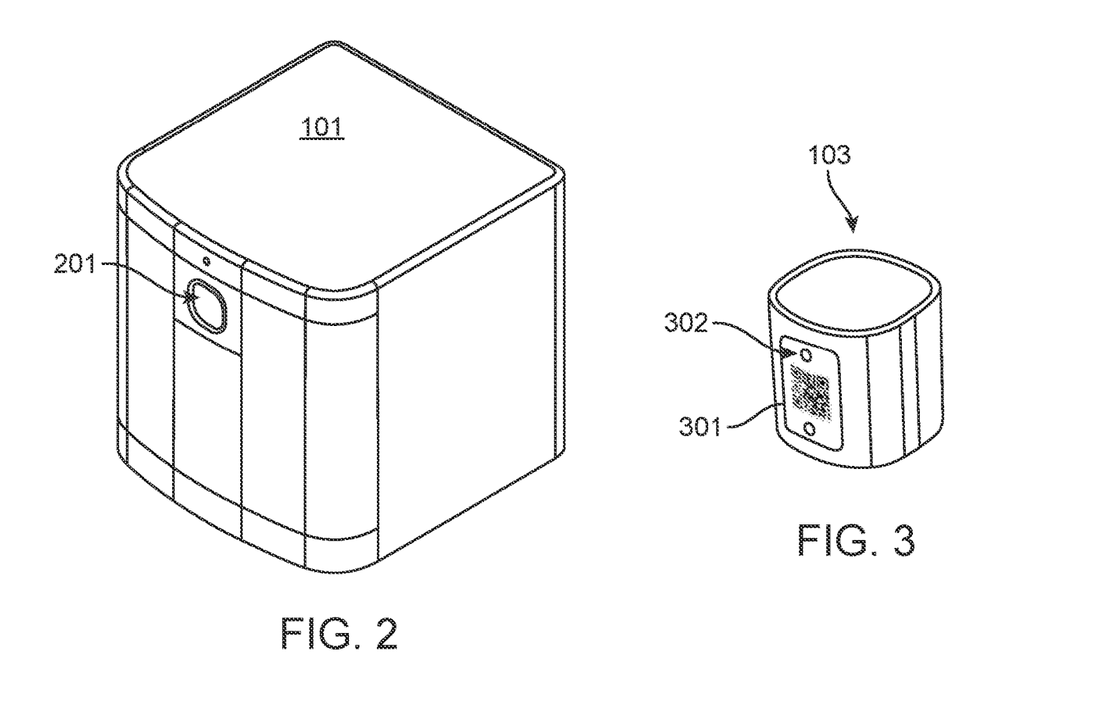
FIG. 2 is an illustrative diagram of a liquid generation machine for a universal liquid generation platform according to embodiments.
FIG. 3 is an illustrative diagram of a cube for a universal liquid generation platform according to embodiments.

Referring to FIG. 1, an illustrative embodiment of some of the components of a liquid generation platform 100 are shown. The platform includes a liquid generation machine 101, secured user bottles 102 (e.g., 102a, 102b) and recipe cubes 103 (103a, 103b, etc.). The machine 101 may be provided in many shapes and forms and may include any number of features are more fully described below. For example, FIG. 2 provides an illustrative diagram of a liquid generation machine 101 according to one embodiment. The platform 100 may include any number of bottles 102, which are designed and configured for compatibility with the machine 101. As further described below, bottles 102 may be securely and uniquely assigned to specific users through the platform 100, which includes personalization and security features to customize the liquid generation process for a given user and possibly prevent unauthorized access to the contents of the bottle 102 to other users. The cubes 103 may also be provided in different shapes and forms in different embodiments. The cubes 103 include recipe-specific ingredients to generate a given liquid, such as a drinking water (e.g., mineral water, sparkling water, etc.) or other fluid, such as pharmaceuticals, energy drinks, or the like.

FIG. 3 provides an illustrative diagram of a cube 103 according to one embodiment. The cube 103 provides a container for water soluble ingredients required to generate a specific solution. In one embodiment, cube 103 is made of an exceptionally strong and durable glass-based material. The cube 103 can withstand extreme temperatures, pressures and humidity without affecting its contents. Also, its material ensures that no migration of molecules of its composition occurs when the soluble compounds are dispensed. According to one embodiment, a cube 103 includes 3 parts: Top, body and bottom. Top and bottom parts include a small sealed orifice which is punctured in the machine's cube slot 201 to extract the material contained inside the cube 103. In embodiments, the walls of the cube's body may feature a label with a logo and recipe information, which may be used to brand cubes with recognizable water brands, for example. A QR code 301 may be printed in the back which the machine reads once the cube 103 is positioned in cube slot 201. In one embodiment, a metal-based part 301 is integrated in the back of the cube's body to allow the machine's cube slot 201 to attract and magnetically attach the cube in its slot as further described below.

In some embodiments, each cube 103 may be equipped with a passive RFID tag, Bluetooth beacon, or the like, to provide a globally unique ID (GUID). For example, a unique encrypted code may be provided that the machine's integrated reader can read and match with a central cube 103 database and display specific information regarding the cube, such as, for example:

Manufacturer/Licensee
Cube category
Manufacturing date
Manufacturing country
Lot number
Expiration Date
Default water making parameters
Unique assigned user
Cube User ID
Water making processes
Composition information
Multimedia for machine 101 display Referring back to FIG. 1, the platform may also include a number of bottles 102, optionally with different capacities. For example, a high-volume format bottle 102a and a low-volume format bottle 102b may be provided. For example, in one embodiment, a high-volume bottle 102a may be a 1.5-liter capacity bottle and the low-volume format be a 750 ml capacity bottle. For example, the 1.5-liter format may be suitable for table-side fluids, like a bottle of mineral or sparkling water, while the 750 ml bottle may be a portable size that can fit in car holders, back-back holders, or the like. In other embodiments, different and/or additional capacity bottles may be provided. For example, a "glass" or "can" size bottle may be provided with a 0.250 ml capacity may be additionally provided. However, any size bottle may be provided according to the needs and requirements for different embodiments.

Figure 4A:
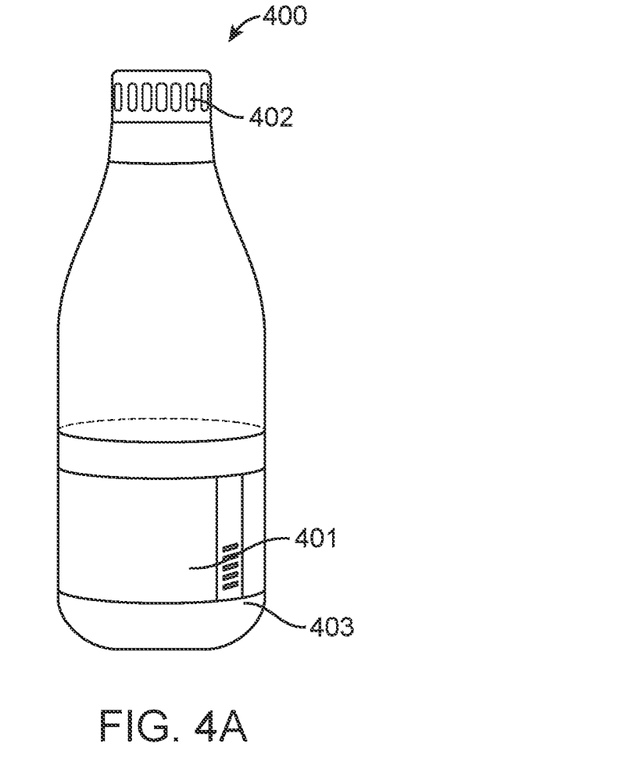
FIG. 4A is an illustrative diagram of a bottle for a universal liquid generation platform according to embodiments.
Figure 4B:
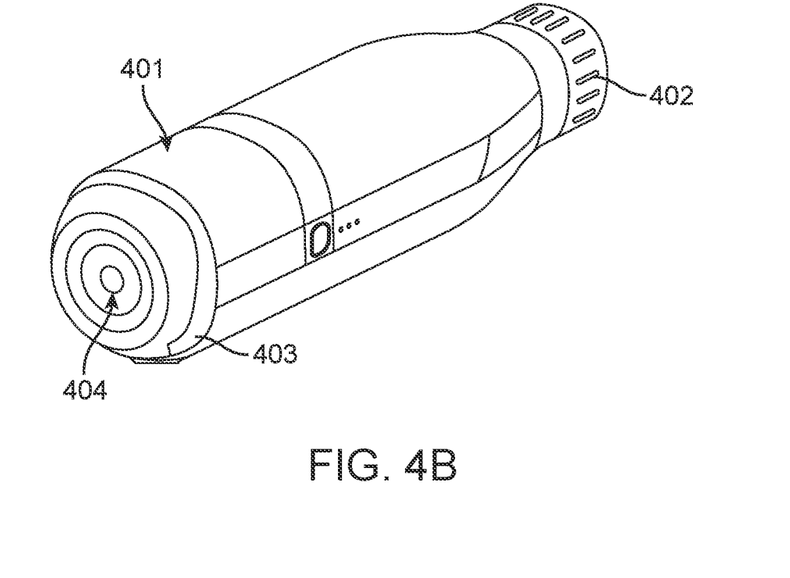
FIG. 4B is another illustrative diagram of a bottle for a universal liquid generation platform according to embodiments.

Referring now to FIG. 4A and FIG. 4b, illustrative embodiments of a bottle 400 are shown according to embodiments. In one embodiment, the bottle 400 may be provided with a high-end, smart, attractive, functional and ergonomic design to enhance the enjoyment of drinking the generated fluids. In embodiments, bottle 400 may integrate a color e-ink or OLED screen 401 for displaying specific information about the solution it currently contains. Bottle 400 also includes a smart base 403, which provides computing and communication capabilities to the bottle 400. The smart base includes a microprocessor, embedded processor, controller, or the like to execute computer instructions, such as firmware or software stored in memory within the smart base 403. The smart base 403 also includes communications hardware, such as near-field-communications, low-energy Bluetooth, or the like, that allows the controller to send and receive data between the bottle and other platform components. The smart base 403 may also include a lithium-ion rechargeable battery (not shown) that can be recharged while docked for filling or by other induction charging methods. In different embodiments, other types of batteries may be used and may be charged using a direct-wired electrical charging circuit or a wireless inductive charging circuit, for example, a Qi compatible power transfer circuit.

According to another aspect in some embodiments, to secure the bottle 400 against unintended users, some bottles 400 may incorporate a smart cap 402. Smart cap 402 may include a top valve (not shown) for filling and cleaning the bottle 400. In embodiments, the smart cap 402 secures the opening of the bottle with a security mechanism that only unlocks when an authorized user is determined by the system. For example, in one embodiment a smartphone app is used to recognize a user, for example using a fingerprint reader, face recognition, other biometric authentication, or a username and password combination, and to send an authorization signal to the bottle 400 to unlock the cap 402. The authorization signal may be sent via near-field-communications (NFC), low-energy Bluetooth, or other wireless means from the smartphone to a receiver in the bottle 400. In other embodiments, bottle 400 includes an integrated fingerprint reader that reads the users fingerprint and using an integrated microprocessor and memory finds a match with a pre-registered fingerprint associated with the authorized user.

Once an authorized user is determined, the smart base 403 sends an unlocking signal to the smart cap to unlock. For example, a unique electromagnetic signal is sent to the cap to mechanically, electromechanically, magnetically, or otherwise recess one or more locking pins protected in a tamper-proof section of the cap that, once recessed, allow the cap to freely rotate or otherwise become removable from the body of the bottle 400.

The smart base 403 is located on the bottom of the bottle 400 and includes a valve 404 for draining the contents of the bottle, for example during a cleaning process. This part centralizes functionalities of the bottle that may be available in different embodiments and includes some or all of the following elements, including for example:

- Active RFID to verify authenticity/compatibility, model, capacity, manufacturing date, etc.
- Accelerometer and load cell to track content availability and consumption
- Temperature sensor to track content temperature
- Bluetooth LE (Low Energy) module for communications with the machine and the app
- Qi-compatible wireless charging battery
- Controllers for Finder ID system and smart cap
- Controllers for e-ink display
- EPROM and RAM memory for storing firmware, software, metadata, and any other data used by controllers
- Magnet to attach to the bottle base of the machine and other surface The machine 101 is a sophisticated IoT-ready modular, medical-grade, and consumer-friendly technology that transforms any tap water into completely pure water and then creates unique liquid solutions by using the contents of cubes 103 (or pods). For example, the machine 101 can re-mineralize purified water to recreate the 'terroir' of any waters of the world as well as create an unlimited variety of new waters, including water-based solutions for medical/health purposes, etc. In some embodiments, the machine 101 may be designed as a domestic appliance with the capabilities of a high-end batch reactor used in chemical laboratories. According to some embodiments, the machine 101 may function to purify and sterilize any source of water, control the temperature of a specific quantity of water and dissolve gases or soluble compounds in the water. In addition, the machine 101 may serve as a brand positioning device, an online shopping platform as well as an advertising platform. In embodiments, the machine may be used at home, in offices or other locations such as cafes, restaurants, hotels, and hospitals.

In embodiments, the machine 101 contains a modular system of function-specific components allowing for easy maintenance and easy upgrades. For example, referring to FIG. 5, an illustrative diagram of component of a modular machine 501 is shown according to embodiments.

Distillation Module

Figure 5:
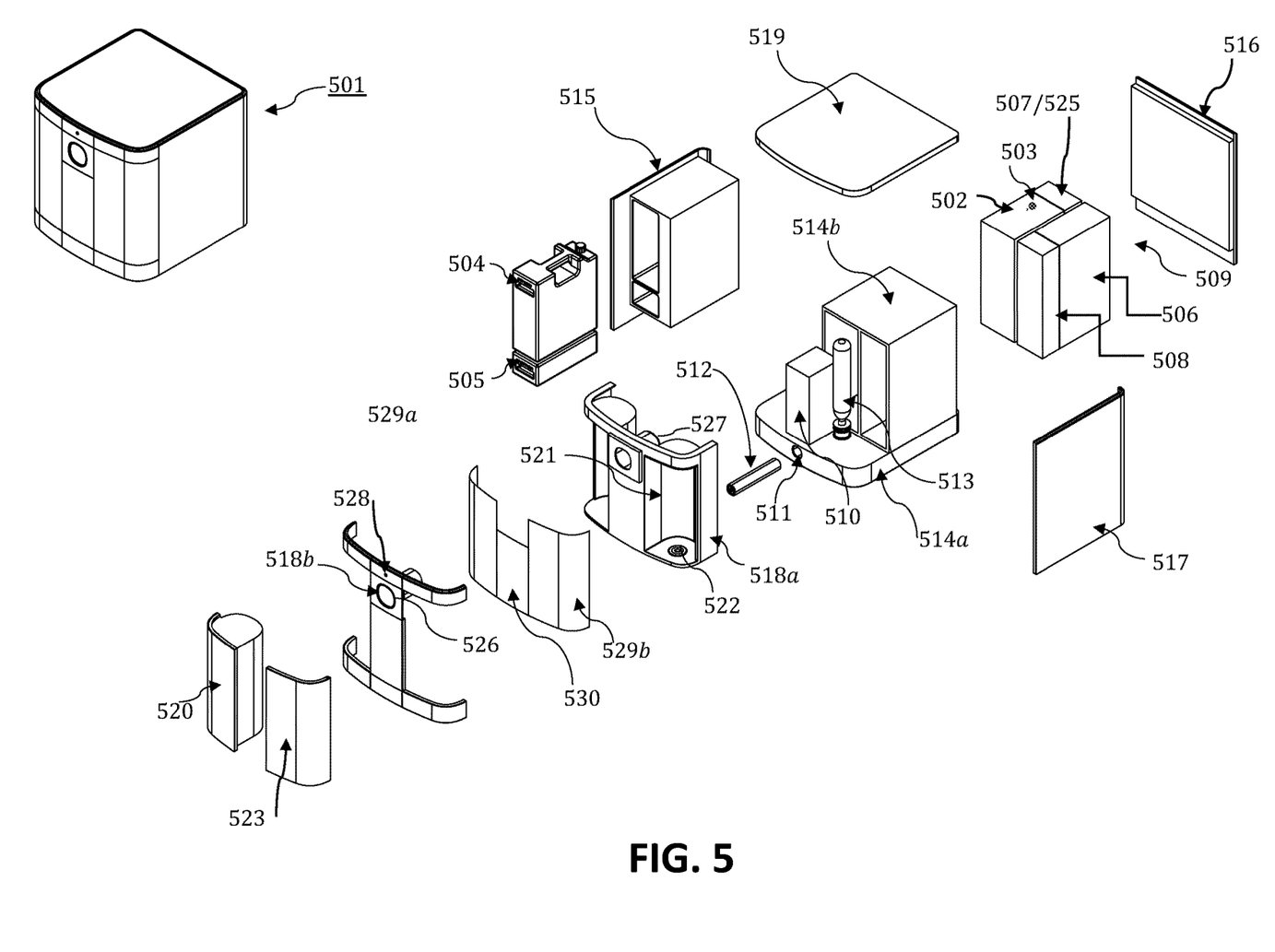
FIG. 5 is an illustrative diagram of the components of a liquid generation machine according to embodiments.

The distillation module 502 contains the parts necessary for a complete sterilization and distillation, or other purification, of liquid water and steam generation. The distillation module 502 uses energy efficient electrical induction, using water's conductivity qualities via a series of carbon-based electrodes which increase the temperature of the water contained in its distillation tank above boiling point (100 C), thereby preventing plating build-up.

In embodiments, the distillation process may be executed in batch sequence. A specific amount of water is heated up in different phases to achieve the specific boiling points for the different compounds the water may contain. For example, certain VOCs have different boiling points: at 100 kPa (1 bar), Toluene boils at 110.6° C.; Benzene at 80.1° C.; etc. This process enables the distillation module 502 to differentiate the gases generated and expel the undesired vapors through a bleeding valve 503 while keeping the water steam inside the circuit.

An internal barometer and temperature sensor (not shown) integrated into the module 502 calculate the different boiling temperatures. The water fed into the distiller can be from both, the raw water tank 504 or the waste water tank 505. The distillation module 502 analyzes the conductivity of the water and adjusts the mix ratio between these two sources of water in order to charge the distillation chamber with water with optimum conductivity and recycle wastewater at the same time. Residues from the distillation tank are regularly eliminated via a sensor-triggered cleaning process performed automatically by the machine as needed. During this cleaning process, a mixture of water and citric acid, among other compounds, fills the distillation tank and is then pumped to the wastewater tank 505 of the machine 501. Steam exiting the distillation module 502 is directed to the heat exchanger module 507 and further directed to a post-distillation filtration system, such as activated carbon, ultimately ending in the distilled water tank 506.

In some examples, distillation module 502 may be replaced with other means of generating drinking water (i.e., potable water or purified water), including using filtration and/or other water purification techniques.

Distilled Water Storage Module

The Distilled Water Storage Module 506 is a glass container that holds the sterilized water subsequent to its distillation in the distiller module. It includes a stirring element that mixes the water to eliminate stagnation and low oxygen zones in the tank. The inside walls of the tank are made of glass to prevent any water contamination due to material migration from the container to the water. To maximize sanitation, the tank also contains a UV-C light (260-270 nm) that constantly irradiates the water. This module includes flow, capacity, TDS and temperature sensors among others as well as an outlet and an inlet channel.

In other examples, water storage module 506 may hold other potable water (e.g., from another water purification module or system, such as a water filtration system).

Heat & Chill Module

According to embodiments, the Heat & Chill module 509 includes a heat exchange module 507 and a thermoelectric cooling module 508. The heat & chill module 509 recycles thermal energy from one hot source to a cold source of water without mixing the water in each channel. The heat & chill module 509 simultaneously lowers the temperature of hot incoming water, either in gaseous or liquid form, in the internal glass coil while raising the temperature of the cooler water stream on its glass encasement. The heat & chill module 509 also may be configured to preheat water for the distillation, or other water purification, process in the distillation module 502 and condensate water coming out of the distillation module 502 and going into the distilled water tank 506.

The heat and chill module 509 also adjusts the temperature of a circulating water flow using a solid-state thermoelectric module 508 (TEM).

In embodiments, the heat and chill module 509 incorporates flow and temperature sensors.

Valves, Pumps and Manifolds (VPM) Module

The VPM Module 510 controls the interconnectivity of gaseous or liquid fluids between the other machine modules. This module houses all the pumping system for water and air. Due to the small flow volume the machine has to displace per second, small medical-precision pumps are used to transports fluids precisely when needed. In addition to directing specific volumes of water or gases to where they are needed, this module is responsible for keeping a vacuum state inside the system. The module 510 includes a HEPA (High Efficiency Particle Arrestance) air filter that purifies the air that will be used during the water oxygenation process. Electronically controlled valve manifolds interconnect income fluid flows to outcome lines based on the requirements of each process. The VPM module operates a variety of sensors, such as flow, temperature, vacuum and pressure.

CO2 Module

The CO2 Module 511 creates, stores and delivers CO2 gas to different parts of the machine 501. To avoid the setbacks of typical carbonation systems currently on the market (i.e., dangerous high-pressure containers of CO2 gas, associated shipping problems, waste generated by empty canisters, etc.), the machine 501 creates on site carbon dioxide gas via chemical reaction facilitated by mixing water with a powder containing a mix of acids and carbonates.

After inserting a special CO2 capsule 512 containing a formula of powder into CO2 module 511 in the front of the machine 501, the capsule's content is mixed with water in a small chamber under vacuum conditions. The carbon dioxide generated during the reaction between the powder solution and water molecules is stored in a pressurized vessel 513, ready for use during the carbonation process for a desired type of carbonated water. After the gas extraction, the mixture of powder and water contained in the module 511 is pumped into the machine's wastewater tank 505.

Base

The base 514 is the equivalent of the motherboard of the machine 501. The base 514 includes the core components of the VPM module 510 and the CO2 module 511 and interconnects all the other modules of the machine 501 while simultaneously acting as its structural base. The base 514 structurally supports and secures the left-side panel 515, the back panel 516, the right-side panel 517, and the structural component front-side panel 518a and its cover panel 518b, all of which are further secured into place by the top panel 519 forming a secure and structurally sound enclosure for the modules of the machine 501. Each module within the machine 501 is designed to fit the anchor system of the base 514, which hermetically seals all connections between each module and the base in a manner that makes it easy for a user or technician to manually unlock, remove, and replace, as necessary. Each module has a designated space on the base 514, with specific placing of electrical, communications and hydropneumatic ports. The interior of the base 514, aside from structural reinforcement elements, includes all piping for such interconnections, as well as wiring for the electrical and communications buses. In some embodiments, a water inlet port and a water outlet port may be integrated on the rear of the base 514 to be used for plumbing the machine to a permanent connection to a tap water source and drain for intake of raw water and discarding waste water as needed.

EYE Module

The EYE Module 520 mixes the content of the cube 103 with water to turn it into the final liquid product delivered to the user. The EYE module 520 is interconnected with other modules of the machine 501 such as the heat & chill module 509 and the carbonation module 513. Its design and function are based on vortex formation and rapid agitation to dissolve efficiently gases and solids into a volume of water. Patterned after the design of stirring devices used in laboratories, the EYE Module 520 uses the flow created by stirring element (not shown), located in the lower section of the module, fitted within the base 514. The EYE module 520 may be made of a pressure-resistant material to ensure its integrity and user safety, especially when creating carbonated water formulas.

In embodiments, the EYE module 520 contains water quality sensors (TDS, pH, turbidity, conductivity) that provide water quality parameters to the main processing unit of the machine 501 and communicate the steps necessary to produce a specific water formula. The EYE module 520 includes an electromagnetic signal emitter device to expose the water body contained inside the module to a specific magnetic field.

The EYE module 520 includes a specifically engineered static mixer (not shown) that mixes, as needed, the combination of the different material contents created in the EYE module 520 (liquid-solid, liquid-gas) on a continuous flow without moving parts. As the liquid moves through the mixer, the non-moving elements continuously blend the materials. The static mixer has two inlets (one of the inlets is dedicated only for gases) and one outlet.

Bottle Chamber

The bottle chamber module 521 performs the functions necessary for emptying, cleaning (inside and outside) and filling the bottle 102. The bottle chamber module 521 integrates two needle valves that are mechanically introduced into the top and bottom sockets of the bottle and sealed. The bottle chamber is connected to other modules, such as the VPM module 510, the heat & chill module 509, the steamer module 525 and the EYE module 520.

Figure 7A:
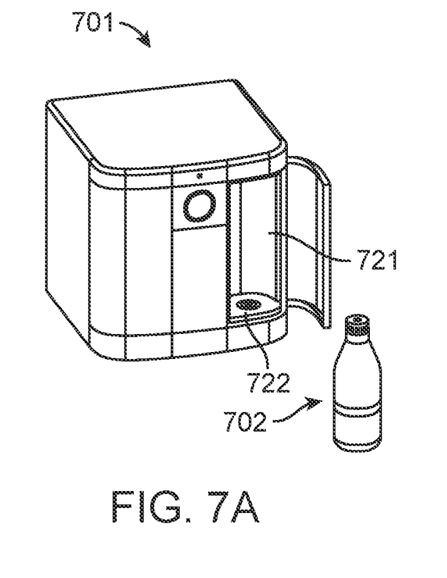
FIG. 7A is an illustrative diagram of a liquid generation machine receiving a bottle in a universal liquid generation platform according to embodiments.
Figure 7B:
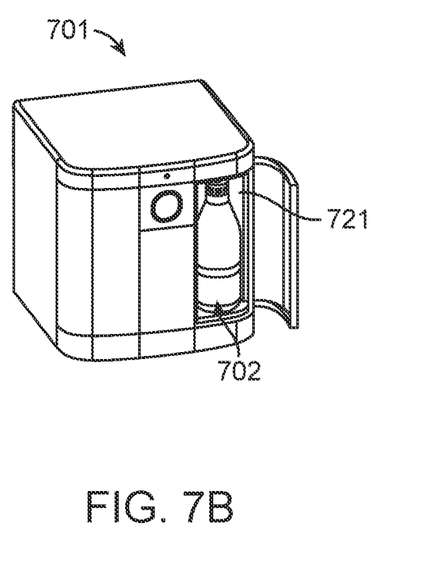
FIG. 7B is another illustrative diagram of a liquid generation machine receiving a bottle in a universal liquid generation platform according to embodiments.

The bottle base 522 is a movable shelf to which compatible bottles 102 can attach. The base 522, via a servo motor-powered mechanism, can move to the front of the machine 501, presenting a surface on which to place the bottle 102 to be retracted into the bottle chamber, secured inside and locked with the bottle module door 523, cleaned, emptied and filled. Since the machine uses hot steam for the cleaning process and deals with high pressures, especially when creating carbonated, the bottle base 522 and door 523 function as a safety barrier between the bottle 102 and the user in case of a quick loss of pressure. The bottle base 522 stabilizes the bottle 102 with a magnetic field that ensures the proper location and stability of the bottle 102 on the bottom surface of the slot. It integrates communication with an compatible bottles, for example via direct contact or magnetically coupled electrical pins, and it serves as a charging station for the bottle's battery by means of direct contact or induction as well as collecting and sending information to the bottle, for example to indicate its contents, provide branding or other multimedia information for displaying in the e-ink display.

The bottle base 522 includes a drain to ensure no deposits of water accumulate in it.

Steamer Module

The steamer module 525 generates hot steam on demand for the cleaning process of the compatible bottles located inside the bottle chamber 521. Using distilled water from the distilled water tank 506, or other purified water, the steamer module 525 is capable of producing a substantial amount of hot steam when needed.

Cube Module

Located in the front panel 518*b* of the machine, the cube slot 526 allows for insertion of cubes 103 into the cube module 527. The cube module 527 secures a cube 103 (or pod), verifies its type and authenticity, and extract its content. The cube module 527 includes a mechanism that punctures the pod and rapidly extracts its contents, which are then delivered to the EYE module 520. The cube slot 526 is protected by a door that closes while in operation to protect the machine from external contamination, as well as to ensure user's safety during the process of emptying the cube 103. The cube module 527 also integrates a face recognition camera 528 located on the front panel 518*b*, which may be used to read QR codes from the cube as it is inserted into the slot 527 or optionally to identify the person who is creating a particular fluid using the specific cube 103. This can enable security features to prevent unauthorized generation of fluids based on the particular cube or more generally unauthorized use of the machine 501.

User Interface Panel

In embodiments, a user interface panel may be provided as part of the machine 501. For example, in some embodiments, a user interface panel may be made of a scratch-protected gorilla glass-type material as part of the front panel 518*b*. This user interface panel not only protects the machine's internal components but, at the same time, also includes an interactive display panel to deliver and collect information to and from the user.

Figure 6:
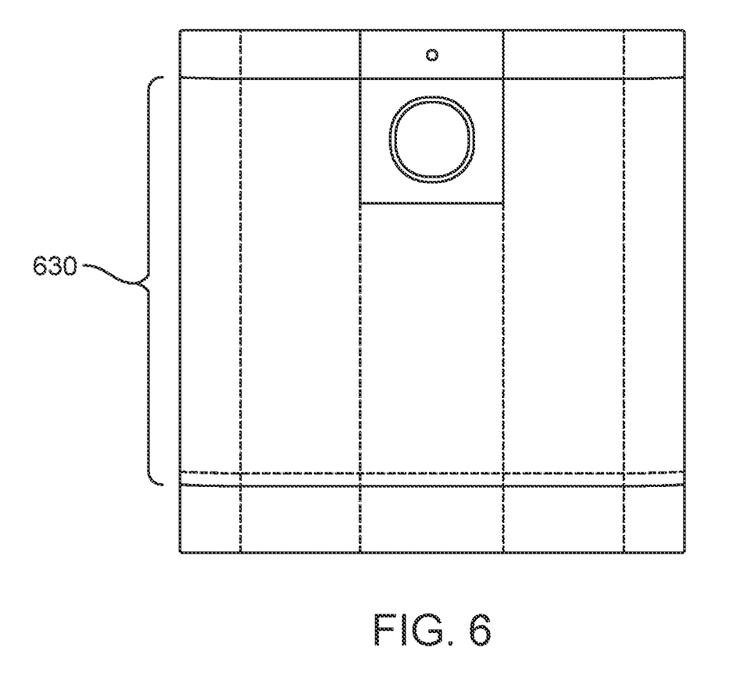
FIG. 6 is an illustrative diagram of a liquid generation machine for a universal liquid generation platform according to embodiments.

In one embodiment, selected sections 529/530 of the front panel 518*b* are made of a transparent OLED touchscreen that serves as an interactive surface to display information and collect information from the user. For example, the front panel OLED panel 529*a* may display information regarding a specific liquid recipe while the liquid is being made in the EYE module 520, superimposing the information over the EYE module chamber behind the OLED panel 529*a*. Similarly, OLED panel 529*b* may display information regarding a bottle 102 while the bottle is in the bottle module 521, such as authorized user information, the contents of the bottle, information regarding cleaning (e.g., schedule, time remaining, cleaning process details, or the like), or other pertinent information. These OLED panels 529 can also be used to provide branding information and/or advertising information regarding the provider of the capsule being used to generate a particular drinking water, pharmaceutical, or other fluid. The integrated touchscreen 530 can also be used to receive input from the user, for example with a touch/soft keyboard, touch UI elements (like buttons, sliders, etc.), or other input UI elements. In some embodiments, the touchscreen 530 may also include an integrated microphone and speaker (not shown) for playback and input of sound, for example, voice commands and user instructions. In embodiments, the OLED panels 529/530 may be provided in different arrangements, for example, as illustrated in FIG. 6, OLED panel 630 in an embodiment of the machine 601 may be provided as a single panel but in other embodiments may be provided as two panels, or as any other number of panels as may be desirable for particular implementations. As mentioned above, in some embodiments, also located on the front panel 518*b* may be a camera 528 that communicates with the CPU Module and facilitates the identification of the person interacting with the machine, inserted cubes, etc.

CPU Module

The CPU Module (not shown) is the main controller unit of the machine 501. It centralizes all communications between the different modules of the machine and houses the machine's power supplies. The CPU module may be housed within one of the other modules, such as for example VPM module 510 or the base 514, or may be provided in a separate module altogether. The CPU module includes one or more processors, GPUs, controllers, and the like to provide software-driven functionality typical of a general-purpose computer. For example, the CPU module may be based on an Intel™, ARM™, Raspberry Pi, or similar microprocessor-based architecture and may include a corresponding operating system. The CPU Module may include firmware or software stored in local memory (RAM/flash) and may be capable of downloading firmware/software updates, diagnostics procedures, etc.

In embodiments, the CPU Module is the central coordinating node that operates the various controllers, actuators, and other software-controlled elements of the machine 501. In various embodiments, the CPU module may perform one or more of the following exemplary functions, as required or necessary for the given implementation:

Gives instructions for the water making process to the different modules and monitors the process.

Stores a database of cube 103 formulas and procedures.

Executes online encrypted verification of User's permits for usage of ID-protected cubes.

Uploads user information such as number and types of cubes used, user behavior, etc., and machine usage and diagnostics to a platform server.

Controls communications interfaces between the machine and other platform components (e.g., bottle, app, remote server, etc.)

Controls RFID reader for cube ID and inventory surrounding the machine (e.g., within NFC/LE Bluetooth reach)

Controls camera for cube ID and user authentication

Additionally, the CPU module may be upgraded and configured with different functionality via firmware/software code. For example, a remote platform server may be in communication with the machine 501 via the CPU module to provide additional software-based functions (e.g., apps) that the user may choose to purchase as upgrades to the existing machine.

User information (e.g., for authentication or authorization purposes), as described herein, may be stored (e.g., in memory or other storage and by any of the computing systems described herein) in a user profile along with other user parameters. The computing systems described herein also may compute statistics of demand for specific beverages based on user parameters (e.g., geography, genetic information, demographics) in the user profile, to predict a future beverage demand for the user based on the user profile, and to allow or restrict a consumption of a beverage based on parameters established by or in the system.

Raw Water Tank

Figure 8:
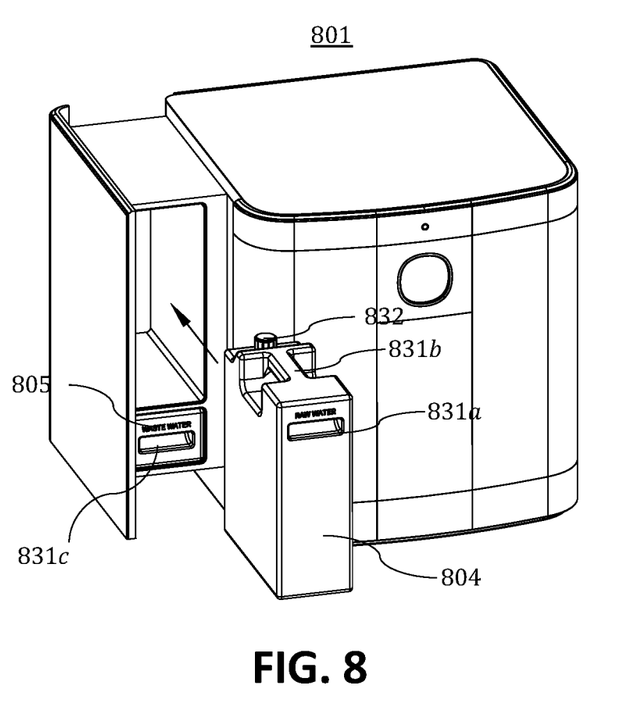
FIG. 8 is an illustrative diagram of water compartments in a liquid generation machine for a universal liquid generation platform according to embodiments.

The raw water tank 504 is a refillable tank that provides water to the distiller module 502. In other examples, raw water tank 504 also may be configured to provide water to another purification module, such as a water filtration module. In embodiments, the raw water tank 504 may be accessible through one of the sides of the machine and/or may be easily removable/portable to facilitate refilling. In some embodiments, the raw water tank 504 may be plumbed-in to a direct source of water and includes a controller and sensor to maintain a desired level of water. For the example, a user setting may be provided through the CPU Module and the UI touch screen 530 for the user to set a programmable water level. A sensor, for example a magnetic float sensor, monitors the water level and provides a signal to a relay or other controller to operate the intake valve, allowing water to flow into the machine until the desired water level is detected. The raw water tank 504 may be provided for any desired capacity. For example, in one embodiment an 8-liter water tank is provided. The raw water tank 504 may be made of any potable-water safe material, including glass, and food-grade plastics, such as, PET or PETE and HDPE. Now referring to FIG. 8, in embodiments, the raw water tank 804 may be provided with handles 831 (e.g., 831a and 831b) to make it easy to remove from the machine 801 for refilling. It may also include a removable cap 832, which in some embodiments may incorporate a valve operable by the VPM module (not shown) for extraction of water.

Waste Water Tank

Referring back to FIG. 5, the waste water tank 505 serves as repository of the residual water of different processes, i.e. clean-up of the distillation module, main piping system cleanup, emptying bottles, EYE module washing, etc. In embodiments, it may be located underneath the main raw water tank 504. In embodiments, the tank 505 is made of chemical resistant materials that can withstand extremely acidic or alkaline contents. In some embodiments, as for example illustrated in FIG. 8, the waste water tank 805 may be easily removable/portable to facilitate cleaning by the user, for example including a handle 831c. In other embodiments, the waste water tank 505 may be directly plumbed into a drainage system and includes a flush valve and associated controller to automatically flush the contents of the waste water tank 505 under the control of the CPU module.

Platform App and Server.

Referring back to FIG. 1, the universal liquid generation platform may, in some embodiments, further include a control application or app that interacts with the machine 101 and bottles 102 for control and other user interface features. The app may run in a portable device, such as a smartphone, tablet, or other mobile device, and through the device's user interface provide a set of features for control and diagnostics of the machine 101, managing bottles 102, and for inventory management and purchasing of cubes 103 as wells as for other features, such as authentication, account management, e-commerce, advertising, social media, and the like. Further, in some embodiments, an app component may be used to broaden or enhance some aspects of the user experience for the consumption of certain machine-generated liquids, such as pharmaceuticals, recreational mind-altering substances, and the like.

The platform may further include, in some embodiments, a remote server or cloud-based component to support some of the functionality provided through the platform. For example, cube database information may be available remotely to the machine and/or app from a remote server. Similarly, inventory management and e-commerce features may be further involve interactions between the machine and/or app and a cloud-based system, including, for example, a cube subscription service, downloads of recipes for recognized cubes, download of multimedia for display on the machines OLED panels and/or bottle e-ink displays, user authorization functions, account creation and management, payment processing, and the like.

Following is a description of operational features and capabilities of different components of the universal liquid generating platform according to various embodiments. The following functionality may be included in some embodiments and not others or may be implemented selectively in specific embodiments according to the desired capabilities, intended market, or user needs. Those of skill in the art will understand that not all features will be required in all instances and that the specific implementation of given features may vary with the implementation embodiments.

Liquid Generating Process

According to embodiments, the machine in the liquid generation platform enables the generation of custom liquids at a user site, eliminating the need for bottling and transportation of liquids for user consumption from a remote location. According to aspects of embodiments of the platform, a liquid generation process includes a set of steps. First, in some embodiments, upon approaching the machine with a cube, the user is identified by the camera in the front panel of the machine using face & gesture recognition software. Once the user is authenticated, the cover of the cube slot opens, and the user inserts the cube.

The machine identifies the cube, for example via QR code reader, RFID reader, contact-based IO pins, or even camera, capable of reading information integrated into the cube, for example as a label, RFID tag or contact-based tag, or the like. For example, a UID associated with the particular cube or cube type may be obtained by the machine from the cube upon insertion. The machine then checks a cube database, either locally maintained or remotely maintained (e.g., in an app or in a cloud-based system) using the machine's communications capabilities, and retrieves information relevant to the identified cube and, optionally, about the identified user. For example, the machine may check whether the identified user is authorized to create the liquid associated with the identified cube inserted into the slot. The machine may further identify the specific type of solution associated with the detected cube in the cube database and may select the specific procedures for creating the liquid solution. The machine can also identify the required capacity of the bottle to be inserted and can display specific information on its frontal screen system to instruct the user accordingly.

In some embodiments, cubes for pharma categories may be protected by restrictions on users who have proper prescriptions, may be checked for drug interactions to safeguard against mistakenly ingesting improper drugs, or the like. In these embodiments, specific cubes can be assigned to a specific person, a group of users or without user restriction. If the user is prohibited from executing the water-making process using the specific cube he/she inserted in the machine, the user is instructed to reclaim the cube from the machine. In embodiments, the machine may be programmed to restrict usage only to a specific group of authorized users.

Interacting with Machine: Information Display and Water Creation Customization

In embodiments, information regarding the specific cube inserted in the machine may be displayed on the OLED screens. This information may be static images, videos, animations, etc., with or without sound. For example, the information display may be customized by a particular brand associated with the inserted cube and the images and/or videos may be brand-specific, such as logo's, commercials, or other marketing content.

The machine may also display information regarding the contents of the cube and can provide a user interface menu to make more information accessible to the user through a system of submenus.

In embodiments, some cubes may let the user adjust certain parameters of the liquid solution to be generated according to a given recipe, such as level of carbonation, concentration/dilution preference, final water temperature, etc. A button is displayed to start the water making process. Once pressed, the front cover of the Cube slot closes, and liquid solution generation begins. In some embodiments, the user interface further includes a voice activated feature allowing voice control of the machine through a voice recognition and natural language processing software module (which may be provided as an upgrade). Optionally, the machine may include an API-driven interface to other home automation systems, such as for example Amazon's Alexa, Google home, Facebook portal, or the like, which may allow for third-party enabled controls, such as voice control, app-based control, or the like.

Bottle Insertion

According to embodiments, the capacity of the bottle required for the current liquid being generated may be displayed on or near the bottle dock. The bottle base can swing out in the front of the machine to becomes accessible to the user. The user places the bottle on the base, and the bottle secures itself on the dock's base via magnetic attraction. The machine proceeds to retrieve information from the bottle smart base system (for example via RFID). At this stage, information retrieved from the bottle can include, for example, the model, serial number, version of its firmware, last time used, type of liquid contained previously, authorized users, etc. among others. In some embodiments, the batteries of the bottle's smart base may be charged when inserted, for example through an electrical connection, inductive connection, or other battery charging mechanism integrated in the base of the machine and the bottle base. If the bottle is not an appropriate type for the inserted cube, the user may be informed and asked for the right type of bottle. If the bottle type is correct, the bottle base is automatically retracted into the bottle chamber and sealed inside. For safety reasons, any resistance on the base closing process will automatically expose the base again.

Emptying and Cleaning Bottle

In some embodiments, once the bottle is secured in the base and inserted in the bottle chamber, needle-type connectors are attached and sealed to the top and bottom valves of the bottle. The machine then empties the bottle contents, pumping them away, including the air in the bottle, creating a vacuum environment. Once the bottle is emptied entirely, the top needle connector starts to inject a stream of hot steam into the bottle. The resulting condensate flows to the bottom valve where it is sucked out of the bottle. This process of introducing steam at very high temperature cleans and disinfects the inside walls of the bottle. Valves inside the bottle chamber direct hot steam onto the bottle's exterior walls as well as of the bottle's cap. An air suction device extracts all steam vapor from inside the bottle chamber and a drain located on its bottom extracts all condensed liquids.

Liquid Generation

In some embodiments, once the bottle is cleaned, the liquid solution making may start. In some embodiments, the liquid making may begin earlier, once the cube and user are identified and/or authorized and the liquid making recipe is determined, even without the bottle being ready for filling. In either case, the recipe-specified volume of water from the distilled water storage module, or other purification module, flows into the EYE module's container. The EYE module's stirrer starts spinning. At the same time, the EYE module circulates the water through the heat & chill module to set up the initial temperature of the water based on the specified liquid preparation procedures. Once water is at the right temperature, special connectors with needles perforate the top and the bottom of the cube. Water from the EYE (possibly even preheated) is injected through one of the valves and extracted through the other. The resulting solution is channeled back to the EYE chamber.

Two outlets, one upper for gases and one lower for water and precipitates of the undissolved content of the cube, pump the content of the EYE chamber through the static mixer located near the EYE. This part is responsible for the efficiently mixing of the different compounds of the recipe. The outflow of the static mixer is directed back to the EYE, creating a recirculation of the solution between the EYE module and the static mixer module.

In some embodiments, a TDS and SST inline sensor analyzes the quality of the solution, determining the duration of the static mixing process. Meanwhile, the stirrer inside the EYE spins the water and creates a powerful vortex flow that is visible to the user of the AIGUA machine. In some embodiments, second or third step in the liquid-making process may be desired. For example, if the liquid requires a carbonation process, the machine proceeds to adjust the temperature of the solution inside the EYE to a temperature specified in the recipe and mix $CO_2$ from the $CO_2$ storage into the solution. The solution contained in the EYE proceeds to a recirculation through the static mixer. $CO_2$ coming from the $CO_2$ storage module is dosed based on the cube formula and injected into the static mixer inlet, to be efficiently dissolved.

Other additional steps may be taken depending on the specific formulation or recipe for the cube. For example, if the liquid requires a specific level of dissolved oxygen, a process similar to the carbonation process described above is executed. Instead of $CO_2$, a specified volume of air, controlled by gas flow sensors and purified by the HEPA filter inside the VPM Module, is injected and dissolved.

In some embodiments, information about the processes the machine is executing may be displayed on the interface at the front panels of the machine.

Once the liquid making process is completed, the solution temperature may need to be adjusted to a specific temperature selected by the user earlier. In this case, the solution is circulated through the heat & chill module to adjust its final temperature.

Bottle Filling and Information Display on Bottle

The solution contained in the EYE is pumped and injected into the bottle, for example through the top needle valve. Information regarding the type of liquid the bottle is filled with is transferred to the bottle's smart base, either via a wired interface (e.g., a contact-based serial interface, like a USB-type interface) or wirelessly (e.g., via Bluetooth, NFC, or the like). The bottle's smart base then proceeds to display the required graphics on its integrated e-ink display.

Extracting the Cube

In some embodiments, once the bottle is filled, the door of the cube slot opens, and the machine automatically extracts the cube for user retrieval or informs the user to extract the used cube. In other embodiments, the used cube may be internally moved to a used cube receptacle (not shown) that may be periodically emptied by the user. Once the cube is extracted, the bottle base with the bottle swings out in the front of the machine and the door of the cube slot closes.

Extracting the Bottle

Once the bottle compartment is opened and the base extended outside the machine, the user proceeds to lift the magnetically attached bottle from the bottle base. Once the machine detects that the bottle has been removed, the bottle chamber base retracts to its original position. An internal automated machine-washing process can then begin to prepare the machine for the next liquid solution creation process.

Depending on the complexity of the recipe and the specific embodiment, the entire solution making process may take 1 to 2 minutes. For example, some factors affecting the making time include required dissolution time, final water temperature, carbonation level, etc.

Post-Liquid-Making Washing Process

According to aspects of some embodiments, after each liquid solution making process, the machine executes a self-cleaning procedure to eliminate any residual solids, gases or liquids in those parts of the machine that have been in contact with the previous solution. This process avoids contamination of subsequently created solutions with any compounds from the previous type. This is especially important subsequent to pharma liquid creation.

In some embodiments, a specific volume of distilled water, or other purified water, from the distilled water storage tank flows through specific channels that are directed to the VPM Module, the EYE, static mixer module, the cube module, and the bottle chamber valves. The circulation of this volume of water carries away any residues that may have accumulated inside the piping in the base and all the aforementioned modules. Water with impurities accumulates in the EYE and is pumped to the waste water tank. A second volume of water is then directed to the EYE chamber. The stirrer located at the bottom of the EYE chamber spins, creating a vortex flow that cleans the interior walls of the EYE chamber and then is pumped to the waste water tank. After this process, the VPM module creates a vacuum inside the piping system and specific elements of the machine.

Distillation Module Cleaning

When readings of sensors located in the distillation module signal the CPU module that a cleaning process is required, the machine informs the user to introduce a cleaning cube in the cube module. This cube is identified, for example via QR code or RFID tag, to enter a self-cleaning mode. The cleaning cube contains a mixture of cleaning solvents and/or detergents, including, for example, citric acid, that helps descaling pipes and other modules. The distillation module is turned off and drained to the waste water tank. Once the cube is introduced in the machine, water from the distilled water tank flows to the EYE. Then content of the cleaning cube is directed to the EYE, and the solution is recirculated through the static mixer. Once the cleaning solution is properly mixed, the distiller is filled with the solution contained in the EYE and let sit for a specified period of time. After this period of time has passed, the content of the distillation module is emptied into the waste water tank. Subsequently, a small volume of distilled water is flushed through the circuit, eliminating any deposits of the previous solution and directed to the waste water tank.

Additional Platform Features

Cube Visualization

According to some embodiments, once a cube has been introduced into the machine, the machine may retrieve information based on the QR and/or RFID code of the cube. This information may be stored locally in the machine or downloaded from remote/cloud-based servers. Cube information can be displayed on the UI panels located at the front of the machine or the app that the user has in his/her mobile device. Such information may contain the contents of the cube, information about the source of the compounds of the cube, brand information, customized recommendations for its consumption, videos and/or animations specifically developed by the brand that commercializes the cube, etc.

Different information may be displayed before, during and/or after the liquid making process. The platform enables the brands behind a cube to customize and position any information or content along the duration of the liquid making process in any of the user interfaces dedicated to this process.

Cube Safety

According to embodiments, cubes can have a certain level of security that allows or denies a specific user to create a type of water with its content. This is an especially important feature of the platform for cubes with pharmacological content. The provider of a specific cube (or box of Cubes)—each individual Cube has a unique encrypted code that identifies it—can assign a specific person as the only authorized user for its liquid creation by using the software and assigning a user ID. The platform servers can store information about cube ID codes and the authorized users designated for their respective use. For example, in some embodiments, doctors/medical practitioners/pharmacies or the like, who prescribe or give access to a patient to a controlled substance, pharmaceutical, drug, or the like, can get access to the platform as an authorizing entity. Through this prescriptive interface, the medical practitioner can assign specific cube IDs to a registered user/patient who must authenticate itself to the platform and provide verifiable biometrics upon registration that are checked before allowing the use of the controlled cubes. For example, a doctor's office may process the registration procedure when a patient visits the office, recording fingerprint, face recognition images, or the like that are later used by the pharma liquid solution generating machine in the user's home to authorize the user before allowing use of the controlled cube.

Once a cube requiring authentication by the platform central database has been introduced to the machine, the machine's user authentication function checks if the user who has inserted the cube into the machine is the authorized user of that specific cube ID. A positive identification allows the user to continue with the water creation process. If denied, the machine indicates the user that he/she is not the user assigned to the cube, requests that the cube be retrieved and notifies the assigned user by email, message or any other form of communication that an unauthorized user has tried to use this Cube. As described above, the machine may positively identify an authorized user via its integrated camera and face recognition capabilities, via voice recognition, fingerprint ID, or using third-party authentication capabilities, such as via a mobile device hardware and app in communication with the machine or the like.

In some embodiments, cubes requiring user authentication may also require the use of secured compatible bottles, equipped with a smart cap and corresponding user authentication capabilities to control the release the lock on the smart cap of the bottle. Only the user assigned to the cube will receive permission to open the bottle once filled with the controlled liquid.

Another level of security available in some embodiments comes from the instructions/settings that the user has introduced in the machine itself. A user with full security access is able to create restrictions for certain users on a specific machine, such as prohibiting the water creation of specific categories of cubes or even limiting the number of cubes that a user, or a group of users, can use over a certain period of time.

Permanent Connection to the Tap Water Line and Drain

In some embodiments, the machine may have the ability to directly connect to a pressurized tap water line and drainage system. If the machine is permanently connected to such piping system, the machine will automatically fill the raw water tanks and empty the waste water tanks based on the requirements of the machine and ordered by its CPU module.

Technology Crossovers: Interaction and Partnerships Between the Platform and Third-Party Apps and Devices Due to the variety of options of waters that the universal fluid generation platform offers, the user information it accumulates and the integrable architecture of the system, the platform opens the door to limitless possible integrations of third-party devices and apps. Here are some examples of integration:

Health and/or other health and fitness apps and tracking devices (Nike Run+, Strava, Nokia scales, Garmin, FitBit, etc): Based on user data from a Health app from a smartphone or wearable devices, fitness tracking apps and devices, etc. the platform can send recommendations of types of fluids and consumption rates to the user.

For user with high heartbeat rates and high body fat index, the platform can recommend fluids that reduce blood pressure, increase fat burning rates, etc.

For users that do aerobic exercises, the platform can recommend the fluid types that help reduce lactates, speed up recovery, essential electrolytes for better recovery or performance, etc.

Real-time interaction: Based on effort of the exercise routine, outdoor temperature, altitude, etc., and user's health data, the platform can recommend volume of fluids to consume, periodicity, etc.

Period Tracking apps: the platform can recommend and track consumption rates and fluid types, such as waters high in iron, etc., to women that will soon have, or are having, their periods.

Pregnancy apps: the platform can recommend to and track consumption rates and fluid types for women during the different stages of pregnancy, such consumption of natural or synthetic antiemetics (anti-nausea) compounds, such as ginger extracts, pyridoxine, doxylamine, etc.

Pharma waters & Virtual Reality/Augmented Reality: The manufacturer of the fluid composition can position audio visual content in a VR or AR headset in order to induce specific user mind states to increase effectiveness of specific compounds. In the pharma industry, studies have shown that the effectiveness of drugs can be increased through those techniques. The platform can interact with third-party devices and provide such media content for the user and guide the user to a specific consumption timing via the information provided by the bottle. Examples may include pharma cubes containing chemotherapy side effects (nausea, anxiety, etc.) palliative drugs; cubes containing antidepressants; cubes containing legal recreational drugs, psychedelics; cubes containing proprioception enhancers for recovery of spinal injuries, yoga exercise routines, etc.; cubes for sensorial enhancement and concentration for sports, military, meditation; cubes containing painkillers for pain management (chronic pain disorders, post-op).

Medical databases & diagnostics tools: The platform can exchange information to and from medical databases to provide a better understanding of a user's hydration habits to medical practitioners. This information can improve diagnostics on user's health.

Genetic Testing and Analysis: Genetics-specialized labs would be able to securely share information regarding user's genetic analysis. Doing so, would allow the platform to recommend specific types of water that may delay or correct certain diseases. For example, a specific person that has genetic markers (mutations in SNCA and LRRK2 genes) showing susceptibility to develop Parkinson's disease: the platform can recommend the consumption of fluids that contain high levels of antioxidants such as carotenoids, lycopene, riboflavin, sulforaphane, erucin or even compounds such as nicotine.

Inventory Control of Cubes

According to some embodiments, the platform may provide cube inventory control features. For example, in some embodiments, an integrated RFID reader of the machine is capable of keeping control of user's cube inventory by tracking cubes located up to 40 ft from the machine. Alternatively, the user can install a series of external RFID readers connected to the machine's private network along a perimeter if the user wants to extend the range of inventory tracking. This is especially useful in commercial applications, offices, hospitals, etc.

Hardware Partnerships/Licensing

One of the purposes of the universal liquid generating platform is to be an inclusive platform for the drinking water industry. Thanks to the cube format, any company who wants to participate in the on-site water generation business enabled by the platform can do so without the need for infrastructure. The disclosed platform provides both, the infrastructure and the distribution for a variety of products related to the water industry, such as the rapidly expanding market for portable bottles and other accessories. Through the platform, branded water manufacturers can develop products compatible with the platform and participate in this new business model and promoting its adoption. For example, sports bottle brands may develop platform-compatible bottles that integrate the smart base and e-ink display, with a compatible size, and compatible top and bottom valve for filling and cleaning in the platform's machines.

The smart bases in the platform compatible bottles also enable interaction with smart coasters or cup holders, which can communicate with the bottle to exchange information. For example, advertising can be delivered from a smart coaster or cup holder to a platform bottle for display on the e-ink display while a user is using the smart coaster or cup holder, for example at a public place, airport lounge, gym, café, in a taxi, ridesharing vehicle, bus, etc.

The platform can also integrate smart cube drawers/storage devices that interoperate with the machine's private network or RFID readers to support its inventory management capabilities.

Other Commercial Applications

The universal liquid generation platform can adapt to the requirements of different industries. In case of commercial applications, such as coffee shops, airports or other places where the volume of water creation is higher than in home environments, the machine can be connected to a separate high-volume distillation and distilled water storage module, capable of distilling water, or other high-volume purification system capable of purifying water, at a sufficient rate to meet the consumption demands. This module uses the same distillation technique than the internal machine distillation module but scaled up for higher performance.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A liquid solution generating platform for generation of custom consumable liquids, the platform comprising:
   a liquid generating machine, the liquid generating machine comprising:
      a water storage module for receiving purified water generated from a tap water source;
      a cube module for receiving and identifying a cube associated with a custom consumable liquid recipe, the cube module configured to retrieve a set of contents from the cube for generating the custom consumable liquid;
      a liquid making module for making the custom consumable liquid, the liquid making module coupled to the cube module for receiving the set of contents and coupled to the water storage module for receiving a volume of purified water specified in the recipe and for mixing the set of contents with the volume of purified water according to the recipe, wherein the mixing further comprises at least one of circulating to a static mixer, dissolving a gas, or adjusting a temperature; and
      a bottle filling and cleaning module, the bottle filling and cleaning module coupled to the liquid making module for receiving the custom consumable liquid and inserting it into a bottle and further coupled to the water storage module and a steam module for steam cleaning the bottle, the bottle filling and cleaning module further comprising a communications interface for communicating with the bottle and an electrical charging interface for charging a battery in the bottle.

2. The platform of claim 1, further comprising a cube containing the set of contents and a machine-readable identifier, the machine-readable identifier providing access to a custom consumable liquid recipe when the cube module identifies the cube based on the machine-readable identifier.

3. The platform of claim 2, wherein the cube is formed of a glass-based material configured to withstand at least one of extreme temperature, extreme pressure, and extreme humidity.

4. The platform of claim 2, wherein the cube comprises a top part and a bottom part, the top part and the bottom part each including a sealed orifice configured to be punctured by the cube module.

5. The platform of claim 2, wherein a surface of the cube comprises a QR code.

6. The platform of claim 2, wherein the cube is equipped to provide a globally unique identifier (GUID).

7. The platform of claim 1, further comprising a bottle for receiving and storing the custom consumable liquid, the bottle comprising a smart base having a communications interface, a battery, and a charging circuit configured to recharge the battery when inserted into the bottle filling and cleaning module.

8. The platform of claim 7, wherein the smart base further comprises a controller for communicating with the bottle filling and cleaning module.

9. The platform of claim 7, wherein the bottle further comprises a display for displaying information associated with the custom consumable liquid.

10. The platform of claim 7, wherein the bottle further comprises a smart cap having a security mechanism configured to unlock upon an indication of an authorized user.

11. The platform of claim 10, wherein the indication includes an authorization signal received from a smartphone.

12. The platform of claim 11, wherein the authorization signal is generated by an application on the smartphone configured to recognize the authorized user.

13. The platform of claim 1, further comprising a water purification module to generate the purified water from the tap water source.

14. The platform of claim 13, wherein the water purification module comprises a water distillation module and the purified water comprises distilled water.

15. The platform of claim 13, wherein the water purification module comprises a water filtration module and the purified water comprises filtered water.

16. The platform of claim 1, wherein the custom consumable liquid comprises a drink.

17. The platform of claim 1, wherein the custom consumable liquid comprises a pharmaceutical.

* * * * *